United States Patent
Rohs et al.

(10) Patent No.: US 9,188,000 B2
(45) Date of Patent: Nov. 17, 2015

(54) AXIAL-PISTON MOTOR WITH CONTINUOUSLY WORKING COMBUSTION CHAMBER HAVING TWO COMBUSTION AIR INPUTS

(75) Inventors: Ulrich Rohs, Dueren (DE); Dieter Voigt, Aachen (DE)

(73) Assignee: GETAS Gesellschaft fuer thermodynamische Antriebssysteme mbH, Dueren (DE)

( * ) Notice: Subject to any disclaimer, the term of this patent is extended or adjusted under 35 U.S.C. 154(b) by 969 days.

(21) Appl. No.: 13/386,600

(22) PCT Filed: Jul. 26, 2010

(86) PCT No.: PCT/DE2010/000875
§ 371 (c)(1),
(2), (4) Date: Jan. 23, 2012

(87) PCT Pub. No.: WO2011/009452
PCT Pub. Date: Jan. 27, 2011

(65) Prior Publication Data
US 2012/0118250 A1    May 17, 2012

(30) Foreign Application Priority Data
Jul. 24, 2009   (DE) .................. 10 2009 034 717

(51) Int. Cl.
| | |
|---|---|
| *F02G 1/055* | (2006.01) |
| *F01B 3/00* | (2006.01) |
| *F02B 47/02* | (2006.01) |
| *F02B 75/26* | (2006.01) |
| *F02M 25/03* | (2006.01) |
| *F02G 1/02* | (2006.01) |
| *F02G 3/02* | (2006.01) |

(52) U.S. Cl.
CPC .................. *F01B 3/00* (2013.01); *F01B 3/0005* (2013.01); *F02B 47/02* (2013.01); *F02B 75/26* (2013.01); *F02M 25/03* (2013.01); *F02G 1/02* (2013.01); *F02G 1/055* (2013.01); *F02G 3/02* (2013.01); *F02G 2250/03* (2013.01); *Y02T 10/121* (2013.01)

(58) Field of Classification Search
CPC ......... F02G 1/02; F02G 3/02; F02G 2250/03; F02G 1/055
See application file for complete search history.

(56) References Cited

U.S. PATENT DOCUMENTS

| | | | |
|---|---|---|---|
| 972,504 A | 10/1910 | Brown | |
| 2,500,925 A * | 3/1950 | Bonvillian et al. | ........... 431/190 |

(Continued)

FOREIGN PATENT DOCUMENTS

| | | |
|---|---|---|
| EP | 1 035 310 | 9/2000 |
| GB | 147 348 | 7/1920 |

(Continued)

OTHER PUBLICATIONS

International Search Report of PCT/DE2010/000875, date of mailing Feb. 9, 2011.

*Primary Examiner* — Ehud Gartenberg
*Assistant Examiner* — Lorne Meade
(74) *Attorney, Agent, or Firm* — Collard & Roe, P.C.

(57) ABSTRACT

The aim of the invention is to improve the efficiency of an axial-piston motor. To this end, the axial-piston motor is provided with a system for regulating the combustion chamber, said system comprising a means for supplying water into the combustion chamber.

10 Claims, 6 Drawing Sheets

(56) References Cited

U.S. PATENT DOCUMENTS

| | | |
|---|---|---|
| 3,088,276 A | 5/1963 | Hudson |
| 3,651,641 A | 3/1972 | Ginter |
| 3,687,117 A | 8/1972 | Panariti |
| 4,212,162 A * | 7/1980 | Kobayashi ................... 60/39.63 |
| 5,507,142 A | 4/1996 | Wintonyk |
| 5,617,719 A | 4/1997 | Ginter |
| 5,743,080 A | 4/1998 | Ginter |
| 6,092,365 A * | 7/2000 | Leidel ........................ 60/39.63 |
| 6,142,665 A * | 11/2000 | Haffner et al. ............... 374/144 |
| 6,412,273 B1 * | 7/2002 | Rohs ........................... 60/39.63 |
| 2010/0258065 A1 * | 10/2010 | Rohs ........................... 123/56.1 |
| 2012/0118249 A1 * | 5/2012 | Rohs et al. .................. 123/56.1 |
| 2012/0118250 A1 * | 5/2012 | Rohs et al. .................. 123/56.1 |
| 2012/0118272 A1 * | 5/2012 | Rohs et al. .................. 123/51 A |

FOREIGN PATENT DOCUMENTS

| | | |
|---|---|---|
| GB | 476 195 | 12/1937 |
| WO | WO 94/10427 | 5/1994 |
| WO | WO 2009/062473 | 5/2009 |

* cited by examiner

AXIAL-PISTON MOTOR WITH CONTINUOUSLY WORKING COMBUSTION CHAMBER HAVING TWO COMBUSTION AIR INPUTS

CROSS REFERENCE TO RELATED APPLICATIONS

This application is the National Stage of PCT/DE2010/000875 filed on Jul. 26, 2010, which claims priority under 35 U.S.C. §119 of German Application No. 10 2009 034 717.8 filed on Jul. 24, 2009. The international application under PCT article 21(2) was not published in English.

The invention relates to an axial-piston engine and to a method for operating an axial-piston engine.

Axial-piston engines are sufficiently known from the state of the art, and are characterized as energy-converting machines, which provide mechanical rotational energy on the output side with the aid of at least one piston, wherein the piston executes a linear oscillatory motion whose alignment is aligned essentially coaxially with the axis of rotation of the rotational energy.

In addition to axial-piston engines which are operated for example only with compressed air, axial-piston engines to which a combustion agent is supplied are also known. This combustion agent can be made up of a plurality of components, for example a fuel and air, wherein the components are fed, together or separately, to one or more combustion chambers.

In the present case, the term "combustion agent" thus designates any material which participates in the combustion, or which is carried with components that participate in the combustion, and which flows through the axial-piston engine. The combustion agent then includes at least a combustible substance or fuel, wherein the term "fuel" in the present context thus describes any material which reacts exothermally through a chemical or other reaction, in particular through a redox reaction. In addition, the combustion agent may also have components such as air, for example, which provide materials for the reaction of the fuel.

In particular, axial-piston engines can also be operated under the principle of internal continuous combustion (icc), according to which combustion agent, i.e., for example fuel and air, is fed continuously to a combustion chamber or to a plurality of combustion chambers.

Moreover, axial-piston engines can work on the one hand with rotating pistons, and correspondingly rotating cylinders, which are moved successively past a combustion chamber.

On the other hand, axial-piston engines can have stationary cylinders, wherein the working medium is then successively distributed to the cylinders according to the desired loading sequence.

For example, icc axial-piston engines having stationary cylinders of this sort are known from EP 1 035 310 A2 and from WO 2009/062473 A2, wherein in EP 1 035 310 A2 an axial-piston engine is disclosed in which the supplying of combustion agent and the removal of exhaust gas are coupled with one another with heat transfer.

The axial-piston engines disclosed in EP 1 035 310 A2 and in WO 2009/062473 A2 have in addition a separation between working cylinders and the corresponding working pistons, and compressor cylinders and the corresponding compressor pistons, wherein the compressor cylinders are provided on the side of the axial-piston engine facing away from the working cylinders. In this respect, a compressor side and a working side can be assigned to such axial-piston engines.

It is understood that the terms "working cylinder," "working piston" and "working side" are used synonymously with the terms "expansion cylinder," "expansion piston" and "expansion side" or "expander cylinder," "expander piston" and "expander side," as well as synonymously with the terms "expansion stage" or "expander stage," wherein an "expander stage" or "expansion stage" designates the totality of all "expansion cylinders" or "expander cylinders" located therein.

The task of the present invention is to improve the efficiency of an axial-piston engine.

This task is accomplished by an axial-piston engine with at least one working cylinder, which is fed from a continuously working combustion chamber, wherein the axial-piston engine has a combustion chamber regulating system that includes application of water to the combustion chamber.

An expanded regulating option can be achieved in particular if the application of water is provided independently of an application of water in or ahead of a combustion agent compressor. In this case, water is ideally applied directly to the combustion chamber for cooling.

If the application of water is provided independently of an application of water in or ahead of a combustion agent compressor, additional varied and thus advantageous regulating and cooling variations can be realized thereby.

The application of water can take place for example in the precombustion chamber.

Cumulatively or alternatively to this, the application of water can also take place advantageously in the main combustion chamber, which is especially advantageous. In particular, the application of water can take place in such a way that the water has been used beforehand as a coolant, in particular for a combustion space. The water or water vapor can also be applied to a combustion chamber in such a way that it flows along a wall of the combustion chamber, so that the combustion chamber wall is preserved as much as possible in this way also.

Accordingly, the task of the present invention is also accomplished by an axial-piston engine with at least one working cylinder, which is fed from a continuously working combustion chamber, wherein the axial-piston engine is characterized in that the combustion chamber has a supply line for liquid water.

In this respect, in this approach to accomplishment, in contrast to other approaches, water is added in liquid form directly into the combustion chamber, wherein it will normally vaporize or pass over to a gaseous state before entering into the combustion chamber, due to the temperature. In this respect, in the present context a "supply line for liquid water" is understood to mean in particular a supply line to the combustion chamber, into which water in liquid form, possibly with the addition of other liquid components, is applied and conducted into the combustion chamber, without the water being mixed with other gaseous components before entering the combustion chamber.

To this end it is particularly advantageous if the supply line is a pressure line that is at the pressure of the combustion chamber or greater. In the case of an axial-piston engine of this sort this can definitely be a pressure of 10 bar or higher, for example a pressure of 30 bar or more. It is understood in this case that the vaporization point of the water is certainly increased significantly by this pressure, wherein it must still be assumed that the water will be applied to the combustion chamber in the form of water vapor, since as a rule the combustion chamber temperatures are above 900° C.

The water applied to the combustion chamber in this way, in particular in contrast to water that is applied in a different way, for example by way of the combustion air or by way of the fuel, can be used advantageously for cooling the combustion chamber, whereby the efficiency of the combustion chamber can be increased, since the thermal energy absorbed during the cooling is returned to the combustion chamber by way of the water.

The water can also be added to the combustion chamber along a combustion chamber wall, which leads directly to a relieving of the combustion chamber wall at this location, since the water is present like a protective film between these combustion agents and the combustion chamber wall until it is finally mixed with the other combustion agents in the combustion chamber.

In order to implement the latter with particularly simple construction, the combustion chamber can have a water nozzle for the water from the supply line for liquid water, wherein the water nozzle has a jet direction with an axial directional component. Any opening in the supply line for liquid water into the combustion chamber can serve as a nozzle in the present case. In particular, the jet of the nozzle should have an axial directional component, i.e., a directional component parallel to the main combustion direction in the combustion chamber.

Preferably, the supply line for liquid water discharges into a combustion chamber that is provided behind both the pre-burner and the main burner. Accordingly, a corresponding nozzle is also preferably provided only in the combustion chamber wall.

If the application of water is used for regulation of an exhaust gas temperature, the heat transfer to the combustion air can be regulated advantageously in particular at a heat exchanger, such as a heat exchanger.

The proportion of water can be used supplementally—depending on the concrete implementation—to regulate the temperature in the combustion chamber, and/or also for reduction of pollution by means of chemical or catalytic reactions of the water.

However, the application of water involves the risk that corrosive processes will be promoted—in particular in areas in which combustion products are already present, i.e., in particular in the combustion chamber. In order to avoid the latter, independent of the other features of the present invention an axial-piston engine with at least one working cylinder that is fed from a continuously working combustion chamber is proposed as the accomplishment of the task of the present invention, which is characterized in that an application of water is stopped and the axial-piston engine is operated for a defined period of time without application of water before operation of the axial-piston engine is ended.

It is understood that the time period is chosen as short as possible, since a user would not wish to wait unnecessarily until the engine stops running, and since the engine is actually no longer needed during this time. On the other hand, the time period is chosen long enough so that the water can be adequately removed, in particular from the areas that are hot or in contact with combustion products. During this time period, combustion agent reservoirs can be charged for example. Also during this time, other shut-down processes can be performed on a motor vehicle, such as for example operationally reliable closing of all windows, wherein the energy supplied by the engine can still be used to this end, which in the final analysis relieves a battery.

It is understood that the application of water may not need to be stopped in its entirety, as long as the remnants of water are operationally reliably removed sufficiently from endangered areas.

According to another aspect of the invention, cumulatively or alternatively to this, an axial-piston engine with a compressor stage comprising at least one cylinder, with an expander stage comprising at least one cylinder, and with at least one heat exchanger is proposed, wherein the heat-absorbing part of the heat exchanger is situated between the compressor stage and the combustion chamber and the heat-emitting part of the heat exchanger is situated between the expander stage and an environment, and wherein the axial-piston engine is characterized in that the heat-absorbing and/or the heat-emitting part of the heat exchanger has, downstream and/or upstream, means for applying at least one fluid.

The application of a fluid into the stream of combustion agent can contribute to an increase in the transfer capacity of the heat exchanger, for example since the specific heat capacity of the stream of combustion agent can be adjusted to the specific heat capacity of the exhaust gas stream or can be raised above the specific heat capacity of the exhaust gas stream, through the application of a suitable fluid. The transfer of heat from the exhaust gas stream to the combustion agent stream influenced thereby, for example advantageously, contributes to enabling a higher volume of heat being able to be coupled into the combustion agent stream and thus into the working cycle while the construction size of the heat exchanger remains the same, whereby the thermodynamic efficiency can be increased. Alternatively or cumulatively, a fluid can also be applied to the exhaust gas stream. The applied fluid in this case can be for example a necessary aid for a downline exhaust gas post-treatment, which can be mixed ideally with the exhaust gas stream by a turbulent flow formed in the heat exchanger, so that a downline exhaust gas post-treatment system can thus be operated with maximum efficiency.

"Downstream" designates in this case the side of the heat exchanger from which the particular fluid emerges, or that part of the exhaust gas line or of the pipework carrying the combustion agent into which the fluid enters after leaving the heat exchanger.

By analogy to this, "upstream" designates the side of the heat exchanger into which the particular fluid enters, or that part of the exhaust gas line or of the pipework carrying the combustion agent from which the fluid enters into the heat exchanger.

In this respect, it does not matter whether the application of the fluid takes place immediately in the near spatial environment of the heat exchanger, or whether the application of the fluid takes place at a greater spatial distance.

As fluid, water and/or combustible substance for example can be applied appropriately. This has the advantage that the combustion agent stream has on the one hand the previously described advantages of an increased specific heat capacity through the application of water and/or combustible substance, and on the other hand that the mixture can be prepared already in the heat exchanger or ahead of the combustion chamber and the combustion can take place in the combustion chamber with a combustion air ratio of the greatest possible local homogeneity. This also has in particular the advantage that the combustion behavior is marked only very slightly or not at all with efficiency-degrading, incomplete combustion.

For another configuration of an axial-piston engine, it is proposed that a water trap be situated in the heat-emitting part of the heat exchanger or downstream from the heat-emitting part of the heat exchanger. Because of the reduced temperature existing at the heat exchanger, vaporous water could condense out and damage the subsequent exhaust gas line by corrosion. Damage to the exhaust gas line can be reduced advantageously through this measure.

In addition, a method for operation of an axial-piston engine with a compressor stage comprising at least one cylinder, with an expander stage comprising at least one cylinder, with at least one combustion chamber between the compressor stage and the expander stage and with at least one heat exchanger is proposed, wherein the heat-absorbing part of the heat exchanger is situated between the compressor stage and the combustion chamber and the heat-emitting part of the heat exchanger is situated between the expander stage and an environment, and wherein this method is characterized in that at least one fluid is applied to the combustion agent stream flowing through the heat exchanger and/or to the exhaust gas stream flowing through the heat exchanger. It is hereby possible—as already shown above—to improve the efficiency-enhancing transfer of heat from an exhaust gas stream being conducted into an environment into a combustion agent stream, by increasing the specific heat capacity of the combustion agent stream through the application of a fluid, and thus also increasing the flow of heat to the combustion agent stream. The regenerative coupling of an energy stream into the working cycle of the axial-piston engine in this case can in turn bring about an increase in the efficiency, in particular an increase in the thermodynamic efficiency, when the process is carried out appropriately.

Advantageously, the axial-piston engine is operated in such a way that water and/or combustible substance are applied. The result of this procedure is that the efficiency in turn, in particular the efficiency of the combustion process, can be increased through ideal mixing in the heat exchanger and ahead of the combustion chamber.

Combustible substance can likewise be applied to the exhaust gas flow, if this is expedient for example for an exhaust gas aftertreatment, so that the exhaust gas temperature can be further increased in the heat exchanger or after the heat exchanger. If necessary, postcombustion, which aftertreats the exhaust gas in an advantageous manner and minimizes pollutants, can also be carried out in this way. Heat released in the heat-emitting part of the heat exchanger could thus also be used indirectly for further warming of the combustion agent stream, so that the efficiency of the axial-piston engine is hardly influenced negatively thereby.

In order to further implement this advantage, it is further proposed that the fluid be applied downstream and/or upstream from the heat exchanger.

Cumulatively or alternatively to this, separated water can be applied back into the combustion agent stream and/or the exhaust gas stream. In the most favorable case, a closed water circuit is thereby realized, to which no additional water needs to be supplied from outside. Thus an additional advantage arises from the fact that a vehicle equipped with an axial-piston engine of this construction does not have to be refilled with water, in particular not with distilled water.

Advantageously, the application of water and/or combustible substance, as explained above, is stopped at a defined point in time before the axial-piston engine comes to a standstill, and the axial-piston engine is operated until it comes to a stop without an application of water and/or fuel. The water, possibly harmful for an exhaust gas line, which can be deposited in the exhaust gas line, in particular when the latter cools, can be avoided by this method. Advantageously, any water is also removed from the axial-piston engine itself before the axial-piston engine comes to a stop, so that damage to components of the axial-piston engine by water or water vapor, especially during the stoppage, is not promoted.

Alternatively or cumulatively to this, the task of the invention can be accomplished by an axial-piston engine with at least one compressor cylinder, with at least one working cylinder and with at least one pressure line, through which compressed combustion agent is conducted from the compressor cylinder to the working cylinder, wherein the stream of combustion agent from the combustion chamber to the working cylinder is controlled by means of at least one control piston and whereby the axial-piston engine is characterized in that the combustion chamber has a combustion chamber floor of reflective metal.

The reflectiveness of a metallic surface imparts the advantage that the flow of heat in the wall that arises due to the high temperature differential between the burned combustion agent and the metallic surface can be reduced, at least for the wall heat flow caused by heat radiation. A large proportion of efficiency losses in a combustion engine arises due to this named wall heat flow, for which reason a reduction of the wall heat flow gives an efficient possibility for increasing the thermodynamic efficiency of the axial-piston engine through the proposed accomplishments of the invention.

It is understood that on the one hand non-metallic surfaces can also yield an advantage in thermodynamic efficiency through reflectiveness, and that on the other hand this advantage in thermodynamic efficiency can be attained cumulatively or alternatively by the fact that a different component of the axial-piston engine, possibly every component that is in contact with combustion agent, is reflective or can be reflective, if the temperature of the combustion agent is higher than the wall temperature.

It is also understood that any other surface coating that is capable of increasing the spectral reflectivity of the component surfaces can be utilized. Furthermore, any surface coating is of course conceivable which alternatively or cumulatively to this reduces the heat transfer coefficient of a component surface caused by heat conduction and convection, in order to reduce the proportion of thermodynamic losses.

The task of the invention is also accomplished, independently of the other features of the invention, by an axial-piston engine with at least one working cylinder that is fed from a continuously working combustion chamber, wherein the combustion chamber advantageously has two combustion air inputs.

By means of a plurality of combustion air inlets, the combustion air ratio lambda ($\lambda$), i.e., the ratio of oxygen to fuel, can be adjusted particularly unproblematically. In the known manner, the entire fuel can be burned thoroughly at a value of $\lambda=1$, since exactly as much oxygen is available as is necessary for burning the entire fuel. Or else a leaner combustion mixture with a value of $\lambda>1$ is adjusted with an oxygen surplus. However, even a richer combustion mixture with $\lambda<1$ and an oxygen deficit can be adjusted particularly uniformly and rapidly when two combustion air inlets are provided. In this respect a combustion air supply via the two combustion air inlets at two different levels is advantageous.

In this case it is immaterial how the present combustion chamber of the axial-piston engine is configured. For example, the combustion chamber can be equipped with a precombustion chamber and a main combustion chamber and thus be capable of advantageous two-stage combustion.

Regulation of the two combustion air inlets can take place advantageously in dependence on speed of revolution. Alternatively, however, regulation can also be undertaken in dependence on power, so that in both cases substantially better regulation of the combustion air supply can be achieved. For example, the second or a further combustion air inlet will be opened when this is advantageous for an operating state of the axial-piston engine.

If, in addition, the two combustion air inlets are designed for combustion air at different temperatures, easy tempering of the flame in the combustion chamber can be enabled, whereby the combustion can be controlled more simply.

It must be pointed out here that these same combustion air inlets to the combustion chamber do not always have to be used. Instead, even combustion air inlets that lead, for example, into an upstream pipe for mixing of combustion agent can be advantageously used.

If the axial-piston engine has at least one heat exchanger, it is advantageous when a first combustion air inlet is fed by combustion air ahead of a heat exchanger and a second combustion air inlet is fed by combustion air behind this or another heat exchanger. Hereby it is possible, in structurally particularly simple manner, to supply combustion air at different temperatures. Especially in this case, regulation of the combustion air inputs can also take place on the basis of the efficiency.

If necessary, a separate combustion air heating system can also provided, especially for starting processes, so that fuel that comes into contact with the combustion air is not cooled unnecessarily.

The task of the invention is also accomplished by an axial-piston engine with at least one working cylinder, which is fed from a continuously working combustion chamber and which has an exhaust gas outlet, whereby the axial-piston engine is characterized by a combustion chamber temperature sensor for determination of the temperature in the combustion chamber.

A temperature sensor of this sort delivers, in a simple manner, a meaningful value regarding the quality of the combustion or regarding the running stability of the axial-piston engine.

Any sensor, for example a resistance temperature sensor, a thermocouple, an infrared sensor or the like, can be used as a temperature sensor.

Preferably, the combustion chamber temperature sensor is designed or situated so that it measures a flame temperature in the combustion chamber. This makes it possible to ascertain especially meaningful values about the combustion within the combustion chamber.

The combustion chamber temperature sensor can be situated in this case at almost any location within the combustion chamber. For example, combustion chamber temperature sensors can be provided in the area of a precombustion chamber and/or of a main combustion chamber.

The axial-piston engine can include in particular a combustion chamber regulating system, which includes the combustion chamber temperature sensor as input sensor and regulates the combustion chamber so that the combustion chamber temperature is between 1,000° C. and 1,500° C. In this way it is possible, by means of a relatively simple and therefore operationally reliable and very fast regulating circuit, to guarantee that the axial-piston engine produces extremely low volumes of pollutants. In particular, the danger of soot developing can be reduced to a minimum. The combustion chamber temperature can be regulated especially quickly and hence advantageously, if two or even more combustion air feeds are used, in particular with combustion air at different temperatures.

Furthermore, cumulatively or alternatively to the above, the axial-piston engine can include an exhaust gas temperature sensor for determination of the exhaust gas temperature. By means of such an exhaust gas temperature sensor, the operating state of a continuously working combustion chamber can likewise be checked and regulated in a technically simple way.

Such a regulating system ensures adequate and complete combustion of fuel, in particular in a simple way, so that the axial-piston engine exhibits optimal efficiency with minimum emission of pollutants.

Advantageously, the combustion chamber regulating system includes the exhaust gas temperature sensor as input sensor. By preference, the combustion chamber is regulated so that the exhaust gas temperature in an operating state, preferably when idling, is between 850° C. and 1,200° C. The latter can be done for example through the appropriate application of water and/or appropriate preheating of the combustion agent, in particular of air, for example by controlling the water temperature or volume of water or else the proportion of air preheated or not preheated in a heat exchanger, in accordance with the aforementioned requirement. Regulation of this type on the basis of a water cooling system is not known from the state of the art relevant at the beginning.

One such operating state is advantageously an idling of the axial-piston engine, whereby a further reduction of pollutants can be achieved.

In order to be able to also regulate in particular a precombustion temperature advantageously in the present case, the combustion chamber temperature sensor can also include, cumulatively or alternatively, a prechamber temperature sensor.

The combustion chamber temperature sensor can likewise be designed as a main combustion chamber temperature sensor, in order to be able to register the operating conditions there. It is understood in this case that both pre- and main combustion chamber temperature sensors can be provided—depending on the concrete implementation of the present invention.

Additional advantages, objectives and properties of the present invention will be explained on the basis of the following description of the enclosed drawing, in which examples of various axial-piston engines and their assemblies are depicted. The figures show the following.

Figure 1:
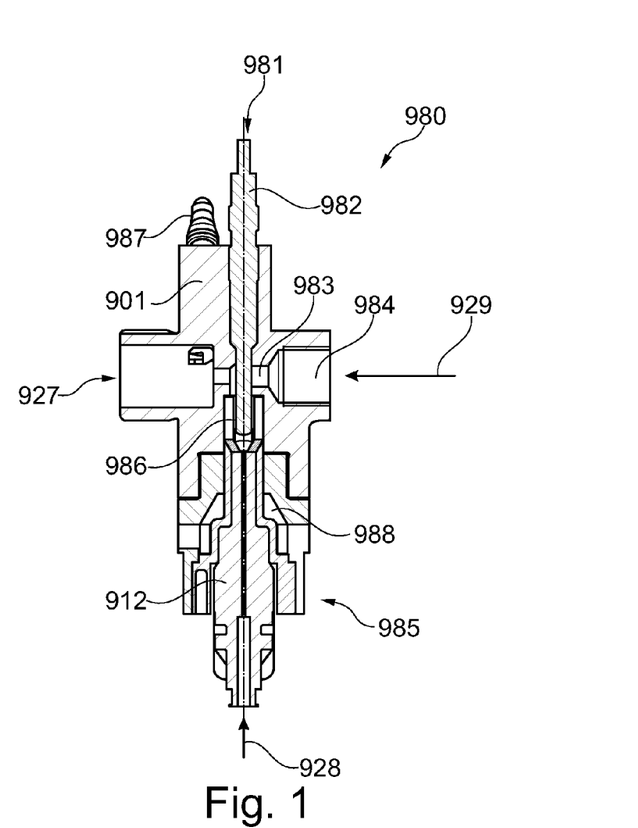
FIG. 1 a schematic sectional view of a fuel heating system of an axial-piston engine for its preburner.

The fuel processing system 980 shown in FIG. 1 is inserted ahead of a precombustion chamber 927 of an axial-piston engine 901, and includes a fuel heater 981 in the form of a glow plug 982. The glow plug 982 corresponds in this case to a mixing pipe 983 for mixing fuel 928 and combustion air 929. The combustion air 929 is fed to the mixing pipe 983 by means of a combustion air supply 984 that is aligned axially therewith. To supply the fuel 928, the fuel processing system 980 includes a fuel injection system 985 with a processing nozzle 912, which is placed radially to the mixing pipe 983. Arranged in this way, the processing nozzle 912 can apply the fuel 928 to a vaporizer 986, wherein the fuel 928 can be vaporized especially effectively by means of the glow plug 982 before it is fed to the mixing pipe 983.

Combustion agent mixed in this manner—fuel 928 and combustion air 929—can, then be applied to the combustion chamber 927, to burn there completely for example by self-ignition. In particular in a starting phase of the axial-piston engine 901, specifically when the axial-piston engine 901 is still cold and far from its operating temperature, the ignition of the combustion agent can be made easier by having a spark plug 987 ignite the combustion agent. To this end, the spark plug 987 projects into the precombustion chamber 927 on the input side. Alternatively, such a spark plug 987 can also be assigned to a mixing pipe 983 and project into the mixing pipe 983 accordingly.

In the area of the fuel injection system 985 a system of cooling 988 by water is also provided, by means of which overheating of the fuel injection system 985 can be prevented effectively. In this exemplary embodiment the water does not enter a preburner, but is subsequently applied directly into a combustion chamber that is situated behind both a preburner and a main burner, as will be explained below in detail. In an alternative embodiment, the water can also be sent to the fuel processing system 980 or directly to the combustion chamber 927, for example also together with the fuel.

Figure 2:
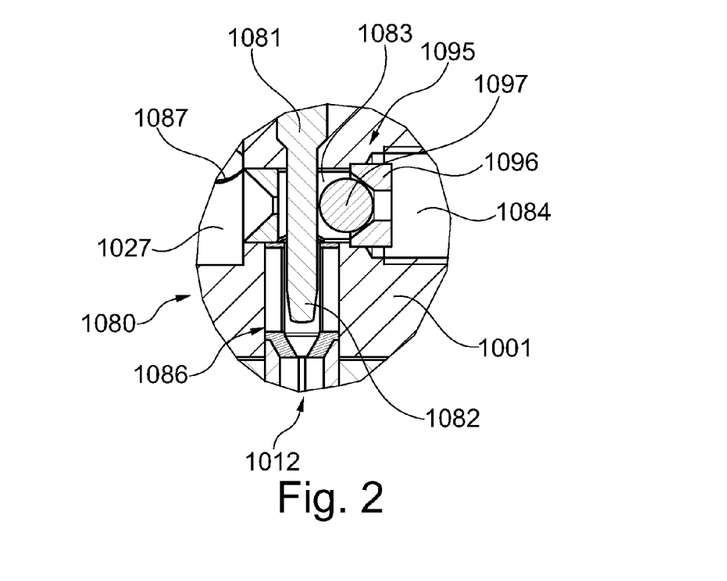
FIG. 2 a schematic sectional view of a check valve ahead of a precombustion chamber of an axial-piston engine.

According to the schematic sectional view of FIG. 2, in the second exemplary embodiment a check valve 1095 is provided ahead of a precombustion chamber 1027 of an axial-piston engine 1001, wherein the check valve 1095 comprises in a known manner a valve seat 1096 and a corresponding ceramic valve ball 1097. Otherwise the fuel processing system 1080 corresponds to the fuel processing system 980.

In this exemplary embodiment the check valve 1095 is situated between a mixing pipe 1083 of a fuel processing system 1080 and a combustion air supply system 1084 aligned axially therewith.

The fuel processing system 1080 includes a fuel heater 1081 in the form of a glow plug 1082 and a processing nozzle 1012 with a vaporizer 1086. By means of the glow plug 1082, a fuel injected by the processing nozzle 1012 can be vaporized in the vaporizer 1086 before it is fed to the mixing pipe 1083 in gaseous form.

In particular during starting processes of the axial-piston engine 1001, the check valve 1095 can contribute to making combustion of combustion agent within the precombustion chamber 1027 uniform, wherein ignition of the combustion agent applied to the precombustion chamber 1027 can be further improved or supported by means of an additional spark plug 1087.

Both the fuel processing system 980 described in FIG. 1 as an example and the check valve 1095 described in FIG. 2 as an example can be used advantageously on axial-piston engines of almost any configuration with at least one working cylinder, that is fed from a continuously working combustion chamber and is equipped with a precombustion chamber and a main combustion chamber, in order to improve the efficiency of such an axial-piston engine in each instance. In particular, the check valve 1095 can also be used correspondingly in the fuel processing system 980, wherein it can also possibly be provided at a different location and not exactly in the mixing pipe. Only three axial-piston engines 201, 401 and 501 will now be explained by way of example, in which the fuel processing system 980 and the check valve 1085 can be used advantageously.

In this case in particular the mixing pipes 983, 1083 can also discharge eccentrically into the precombustion chambers 927, 1027. The spark plugs 987, 1087 can likewise be provided in the mixing pipe 983, 1083 or at some other suitable location.

Figure 3:
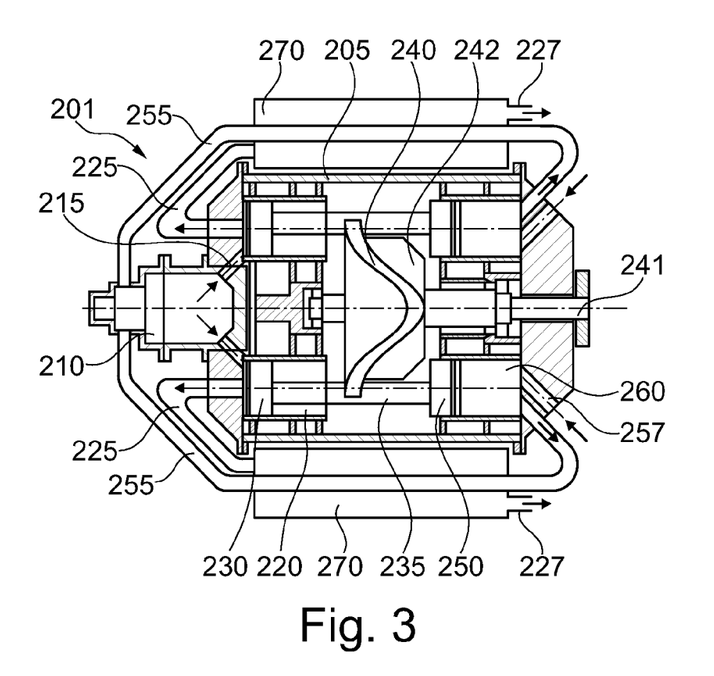
FIG. 3 a schematic sectional view of an axial-piston engine with two heat exchangers, on which the assemblies from FIGS. 1 and 2 can be used advantageously.

The axial-piston engine 201 depicted as an example in FIG. 3 has a continuously working combustion chamber 210, from which working medium is fed successively via shot channels 215 (numbered as an example) to working cylinders 220 (numbered as an example). Situated in each of the working cylinders 220 are working pistons 230 (numbered as an example), which are connected on the one hand by way of a straight connecting rod 235 to an output, which is realized in this exemplary embodiment as a spacer 242 carrying a curved track 240, situated on an output shaft 241, and are connected on the other hand to a compressor piston 250, each of which runs in the compressor cylinder 260 in a manner explained in greater detail below.

After the working medium has performed its work in the working cylinder 220 and has placed a load on the working piston 230 accordingly, the working medium is expelled from working cylinder 220 through the exhaust gas channels 225. Provided on the exhaust gas channels 225 are temperature sensors, not shown, which measure the temperature of the exhaust gas.

The exhaust gas channels 225 discharge in each instance into heat exchangers 270, and subsequently leave the axial-piston engine 201 at appropriate outlets 227 in a known manner. The outlets 227 for their part can be connected again in particular to a ring channel, not shown, so that in the end the exhaust gas leaves the engine 201 at only one or two places. Depending on the concrete configuration in particular of the heat exchanger 270, a sound damper can possibly also be dispensed with, since the heat exchangers 270 themselves already have a sound-damping effect.

The heat exchangers 270 serve to preheat combustion agent which is compressed in the compressor cylinders 260 by the compressor pistons 250 and conducted through a pressure line 255 to the combustion chamber 210. The compression takes place in this case in a known manner, by the fact that supply air is drawn in through supply lines 257 (numbered as an example) by the compressor pistons 250 and compressed in the compressor cylinders 260. Known and readily appropriately utilizable valve systems are used to this end.

The axial-piston engine 201 has two heat exchangers 270, each of which is situated axially in reference to the axial-piston engine 201. Through this arrangement, the paths which the exhaust gas must traverse through the exhaust gas channels 225 to the heat exchangers 270 can be reduced significantly, compared to state-of-the-art axial-piston engines. The result of this is that in the end the exhaust gas reaches the respective heat exchanger 270 at a significantly higher temperature, so that in the end the combustion agent can also be preheated to correspondingly higher temperatures. In practice, it has been found that at least 20% of fuel can be saved through such a configuration. It is assumed in this connection that even savings of up to 30% or more are possible by means of an optimized design.

In this connection it is understood that the efficiency of the axial-piston engine 201 can be increased through additional measures. For example, the combustion agent can be used in a known manner for cooling or thermally insulating the combustion chamber 210, whereby its temperature can be increased still further before it enters the combustion chamber 210. Let it be emphasized here that the corresponding tempering can be limited on the one hand only to components of the combustion agent, as is the case in the present exemplary embodiment in reference to combustion air. It is also conceivable to apply water to the combustion air already before or during the compression; this is also readily possible afterwards, however, for example in the pressure line 255.

The application of water into the compressor cylinder 260, for example, can take place during an intake stroke of the corresponding compressor piston 250, which results in isothermal compression, or compression as close as possible to isothermal compression. As is directly apparent, each working cycle of the compressor piston 250 comprises an intake stroke and a compression stroke, wherein during the intake stroke combustion agent enters the compressor cylinder 260, which is then compressed, i.e., compressed, during the compression stroke, and conveyed into the pressure line 255. By applying water during the intake stroke, a uniform distribution of the water can be ensured in an operationally simple manner.

Preferably, the fuel is processed as described above. This can be dispensed with, however, depending on the concrete exemplary embodiment.

In this configuration the application of water can also take place in the pressure line 255, wherein the water mixes uniformly with the combustion agent within the heat exchanger due to an appropriate deflection of the flow. The exhaust gas channel 225 can also be chosen for the application of water or another fluid, such as fuel or means for exhaust gas aftertreatment, in order to ensure homogeneous mixing within the heat exchanger 270. The configuration of the depicted heat exchanger 270 also allows aftertreatment of the exhaust gas in the heat exchanger itself, wherein heat released by the aftertreatment is supplied directly to the combustion agent present in the pressure line 255. Situated in the outlet 227 is a water trap, not shown, which returns the condensed water present in the exhaust gas to the axial-piston engine 201 for renewed application. The water trap can of course be realized in combination with a condenser. Furthermore, use with similarly designed axial-piston engines is of course possible, whereby the other advantageous features of the axial-piston engine 201 or of similar axial-piston engines are advantageous even without use of a water trap in the outlet 227.

Figure 4:
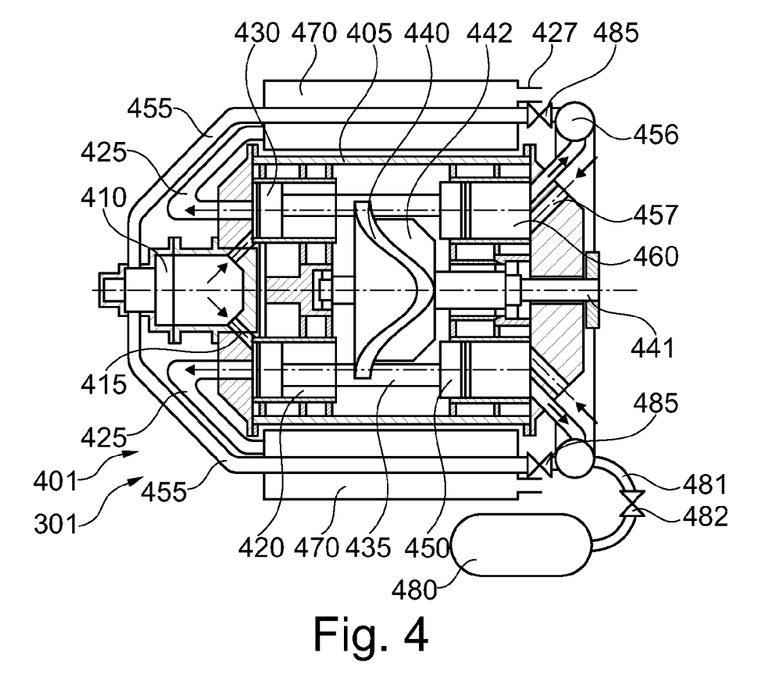
FIG. 4 a schematic sectional view of an axial-piston engine with two heat exchangers and with a combustion agent reservoir, on which the assemblies from FIGS. 1 and 2 can be used advantageously.

The axial-piston engine 401 depicted in FIG. 4 only as an example also corresponds essentially to the axial-piston engine 201 according to FIG. 3. Accordingly, identically or similarly working assemblies are also labeled similarly, and differ only in the first digit. Accordingly, in other respects a detailed explanation of the mode of operation will also be dispensed with for this exemplary embodiment, since that was already done in reference to the axial-piston engine 201 according to FIG. 3.

The axial-piston engine 401 also includes a housing body 405, on which a continuously working combustion chamber 410, six working cylinders 420 and six compressor cylinders 460 are provided. In this case the combustion chamber 410 is connected via respective shot channels 415 to the working cylinders 420, so that working medium can be fed to the working cylinders 420 corresponding to the timing rate of the axial-piston engine 401.

After its work is done, the working medium leaves the working cylinders 420 through respective exhaust gas channels 425, which lead to heat exchangers 470, wherein these heat exchangers 470 are arranged identically to the heat exchangers 270 of the axial-piston engine 201 according to FIG. 3. The working medium leaves the heat exchangers 470 through outlets 427 (numbered as an example).

Situated in the working cylinders 420 and the compressor cylinders 460 are working pistons 430 and compressor pistons 450, respectively, which are connected with one another by means of a rigid connecting rod 435. The connecting rod 435 includes in a known manner a curved track 440, which is provided on a spacer 424, which ultimately drives an output shaft 441.

In this exemplary embodiment also, combustion air is drawn in through supply lines 457 and compressed in the compressor cylinders 460, in order to be applied via pressure lines 455 to the combustion chamber 410, wherein the measures named in the case of the aforementioned exemplary embodiment can likewise be provided, depending on the concrete implementation.

In addition, in the case of the axial-piston engine 401 the pressure lines 455 are connected with one another via a ring channel 456, whereby a uniform pressure in all pressure lines 455 can be guaranteed in a known manner. Between the ring channel 456 and each of the pressure lines 455 valves 485 are provided, whereby the supply of combustion agent can be regulated or set by the pressure lines 455. Furthermore, a combustion agent reservoir 480 is connected to the ring channel 456 via a reservoir line 481, in which a valve 482 is likewise situated.

The valves 482 and 485 can be opened or closed, depending on the operating state of the axial-piston engine 401. Thus it is conceivable, for example, to close one of the valves 485 when the axial-piston engine 401 needs less combustion agent. It is also conceivable to partially close all valves 485 in such operating situations, and to allow them to operate as throttles. The surplus of combustion agent can then be fed to the combustion agent reservoir 480 when valve 482 is open. The latter is also possible in particular when the axial-piston engine 401 is running under deceleration, i.e., when no combustion agent at all is needed, but rather it is being driven via the output shaft 441. The surplus of combustion agent caused by the movement of the compressor pistons 450 that occurs in such an operating situation can likewise readily be stored in the combustion agent reservoir 480.

The combustion agent stored in this way can be fed supplementally to the axial-piston engine 401 as needed, i.e., in particular in driving-off or acceleration situations, as well as for starting, so that a surplus of combustion agent is provided without additional or more rapid movements of the compressor pistons 450.

The valves 482 and 485 can also be dispensed with, if appropriate, to guarantee the latter. Foregoing such valves for prolonged storage of compressed combustion agent seems little suited, due to unavoidable leakage.

In an alternative embodiment to the axial-piston engine 401, the ring channel 456 can be dispensed with, wherein the outlets of the compressor cylinders 460 are combined corresponding to the number of pressure lines 455—possibly by means of a section of ring channel. With a configuration of this sort it may possibly make sense to connect only one of the pressure lines 455, or not all pressure lines 455 to the combustion agent reservoir 480, or to provide them as connectible. Such a configuration indeed means that not all compressor pistons 450 can fill the combustion agent reservoir 480 during deceleration. On the other hand, sufficient combustion agent is then available to the combustion chamber 410 so that combustion can be maintained without additional regulation or control system measures. Simultaneously with this, the combustion agent reservoir 480 is filled by means of the other compressor pistons 450, so that combustion agent is stockpiled accordingly and is available immediately, in particular for starting, driving off or acceleration phases.

It is understood that the axial-piston engine 401, in a different design variant not shown explicitly here, can be equipped with two combustion agent reservoirs 480, wherein the two combustion agent reservoirs 480 can then also be charged with different pressures, so that it is always possible with the two combustion agent reservoirs 480 to work with different pressure intervals in real time.

Preferably a pressure regulating system is provided in this case, which sets a first lower pressure limit and a first upper pressure limit for the first combustion agent reservoir 480, and a second lower pressure limit and a second upper pressure limit for the second combustion agent reservoir (not shown here), within which each combustion agent reservoir 480 is charged with pressures, wherein the first upper pressure limit is below the second upper pressure limit and the first lower pressure limit is below the second lower pressure limit. Specifically, the first upper pressure limit can be set lower than or equal to the second lower pressure limit.

Not shown specifically in FIGS. 3 and 4 are temperature sensors for measurement of the temperature of the exhaust gas or in the combustion chamber. For such temperature sensors, all temperature sensors can be considered which can operationally reliably measure temperatures between 800° C. and 1,100° C. and higher. In particular, if the combustion chamber comprises a precombustion chamber and a main combustion chamber, the temperature of the precombustion chamber but also the temperature of the main combustion chamber can be measured by means of such temperature sensors. In this respect, the axial-piston engines 201 and 401 described above can be regulated in each instance by means of the temperature sensors in such a way that the exhaust gas temperature when leaving the working cylinders 220 and 420 is approximately 900° C., and the temperature in the precombustion chamber—if present—is approximately 1,000° C.

Figure 5:
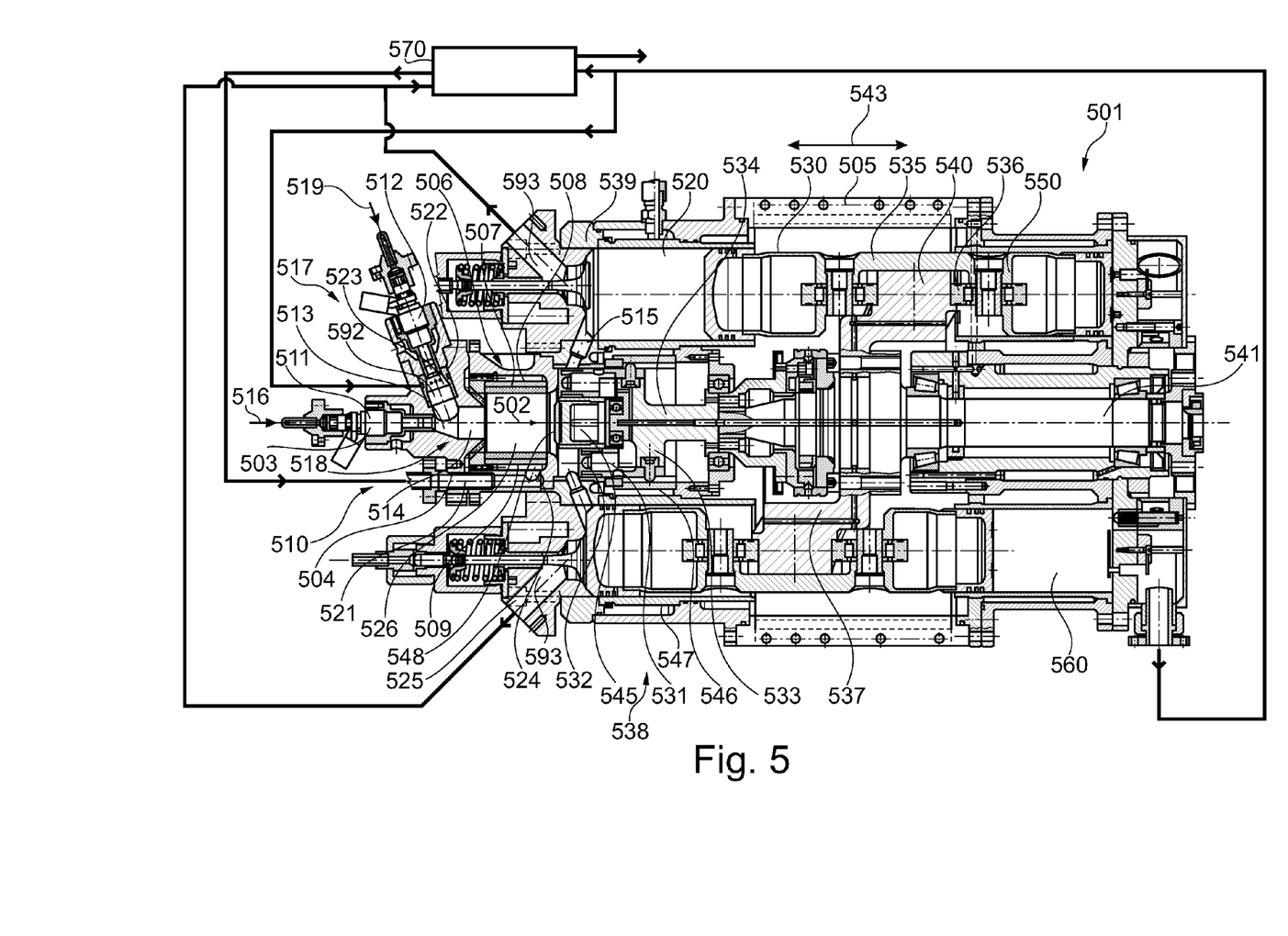
FIG. 5 a schematic sectional view of another axial-piston engine, on which the assemblies from FIGS. 1 and 2 can likewise be used advantageously.

In the case of the other axial-piston engine 501 shown as an example according to the depiction in FIG. 5, such temperature sensors are present in the form of a prechamber temperature sensor 592 and two exhaust gas temperature sensors 593, and are depicted schematically accordingly. In particular by means of the prechamber temperature sensor 592—which in this exemplary embodiment can also be referred to as preburner temperature sensor 592, due to its proximity to a preburner 517 of the other axial-piston engine 501—a meaningful value concerning the quality of combustion or with regard to the running stability of the other axial-piston engine 501 is ascertained. For example, a flame temperature can be measured in the preburner 517, in order to be able to regulate different operating states in the other axial-piston engine 501 by means of a combustion chamber regulating system. By means of the exhaust gas temperature sensors 593, which are positioned at outlets or exhaust gas channels 525 of the respective working cylinder 520, specifically the operating state of the combustion chamber 510 can be checked cumulatively and regulated if necessary, so that optimal combustion of the combustion agent is always ensured.

Otherwise, the construction and operating principle of the other axial-piston engine 501 correspond to those of the previously described axial-piston engines. In this respect, the other axial-piston engine 501 has a housing body 505, on which a continuously working combustion chamber 510, six working cylinders 520 and six compressor cylinders 560 are provided.

Inside the combustion chamber 510, combustion agent can be both ignited and burned, wherein the combustion chamber 510 can be charged with combustion agent in the manner described above. Advantageously, the other axial-piston engine 501 works with a two-stage combustion system, to which end the combustion chamber 510 has the previously already mentioned preburner 517 and a main burner 518. Combustion agent can be injected into the preburner 517 and into the main burner 518, wherein a proportion of combustion air of the axial-piston engine 501, which specifically in this exemplary embodiment can be smaller than 15% of the total combustion air, can also be introduced in particular into the preburner 517. Preferably, the pressure at which the combustion air is applied to the preburner 517 is higher than the pressure at which combustion air is applied to the main burner 518. This can be achieved especially easily by using channel systems with appropriately differing flow resistances for the corresponding supply lines. In particular, a shorter heat exchanger or even none at all can be used for example for the combustion air applied to the preburner 517, while the combustion air applied to the main burner 518 is conducted through the heat exchangers depicted in the drawing.

The preburner 517 has a smaller diameter than the main burner 518, wherein the combustion chamber 510 has a transition area that comprises a conical chamber 513 and a cylindrical chamber 514.

To supply combustion agent and combustion air, on the one hand a main nozzle 511 and on the other hand a processing nozzle 512 discharge into the combustion chamber 510, in particular into the associated conical chamber 513. By means of the main nozzle 511 and the processing nozzle 512, combustion agent or combustible substance can be injected into the combustion chambers 510, whereby in this exemplary embodiment the combustion agent injected by means of the processing nozzle 512 are mixed with combustion air via a perforated ring 523.

The main nozzle 511 is oriented essentially parallel to a main combustion direction 502 of the combustion chamber 510. Furthermore, the main nozzle 511 is oriented coaxially to an axis of symmetry 503 of the combustion chamber 510, wherein the axis of symmetry 503 lies parallel to the main combustion direction 502.

Furthermore, the processing nozzle 512 is situated at an angle (not sketched in explicitly here for the sake of clarity) with respect to the main nozzle, so that a jet direction 516 of the main nozzle 511 and a jet direction 519 of the processing nozzle 512 intersect at a mutual point of intersection within the conical chamber 513. In this way, the fuel can be processed from the main nozzle 511 through the preburner 517, and in particular is thermally decomposed before it arrives in the combustion space 526.

Combustible substance or fuel is injected from the main nozzle 511 into the main burner 518 in this exemplary embodiment without additional air supply, and is thermally decomposed by the preburner 517, as already explained earlier. To this end, the volume of combustion air corresponding to the quantity of combustible substance flowing through the main nozzle 511 is introduced into a combustion space 526 behind the preburner 517 or the main burner 518, to which end a separate combustion air supply system 504 is provided, which discharges into the combustion space 526.

To this end, the separate combustion air supply system 504 is connected to a process air supply 521, which is conducted via the heat exchanger 570 and delivers the combustion air at a second temperature, wherein another combustion air supply 522 can be supplied with combustion air directly from the compressor or compressor piston 550, which in this case supply a perforated ring 523 with combustion air. The perforated ring 523 is assigned in this case to processing nozzle 512. In this respect, the combustible substance injected with the processing nozzle 512, mixed additionally with process air, can be injected into the preburner 517 or into the conical chamber 513 of the main burner 518. Combustion air at a first temperature different from the second temperature is delivered from a combustion air stream from a branch that exits the stream ahead of the heat exchanger 570. The combustion air feed stream feeds the process air supply 521 after the heat exchanger 570. The combustion air stream comes from a rear of the engine near the compressor cylinder 560.

In addition, the combustion chamber 510, in particular the combustion space 526, includes a ceramic assembly 506, which is air-cooled in this exemplary embodiment. The ceramic assembly 506 includes in this case a ceramic combustion chamber wall 507, which in turn is surrounded by a profiled steel pipe 508. Around this profiled pipe 508 extends a cooling air chamber 509, which is connected to the process air supply system 521 by means of a cooling air chamber supply system 524.

The known working cylinders 520 carry corresponding working pistons 530, which are mechanically connected to compressor pistons 550 by means of connecting rods 535.

In this exemplary embodiment the connecting rods 535 include connecting rod running wheels 536, which run along a curved track 540, while the working pistons 530 or the compressor pistons 550 are moved. An output shaft 541 is thereby set in rotation, which is connected to the curved track 540 by means of a driving curved track carrier 537. Power produced by the axial-piston engine 501 can be delivered via the output shaft 541.

In a known way, by means of the compressor pistons 550, compression of the process air occurs, also including injected water if appropriate, which can be used if necessary for additional cooling. If the application of water or of water vapor occurs during an intake stroke of the corresponding compressor piston 550, isothermal compression of the combustion agent can specifically be promoted. An application of water that accompanies the intake stroke can ensure an especially uniform distribution of the water within the combustion agent, in an operationally simple manner.

Exhaust gases can be cooled significantly more deeply thereby, if necessary, in one or more heat exchangers 570 (see also FIG. 4), if the process air is to be prewarmed by means of one or more such heat exchangers 570 and carried to the combustion chamber 510 as combustion agent, as already described in detail for example, at least in the exemplary embodiment explained above for FIG. 4. The exhaust gases can be fed to the heat exchanger 570 or heat exchangers via the exhaust gas channels 525 named above, wherein the heat exchangers 570 are arranged axially in reference to the other axial-piston engine 501.

In addition, the process air can be further prewarmed or heated through a contact with additional assemblies of the axial-piston engine 501 that must be cooled, as has also already been explained. The process air compressed and heated in this way is then applied to the combustion chamber 510 in a manner that has already been explained, whereby the efficiency of the other axial-piston engine 501 can be further increased.

Each of the working cylinders 520 of the axial-piston engine 501 is connected via a shot channel 515 to the combustion chamber 510, so that an ignited combustion agent-air mixture can pass out of the combustion chamber 510 via the shot channels 515 into the respective working cylinder 520 and can perform work on the working pistons 530 as a working medium.

In this respect, the working medium flowing from the combustion chamber 510 can be fed via at least one shot channel 515 successively to at least two working cylinders 520, wherein for each working cylinder 520 one shot channel 515 is provided, which can be closed and opened by means of a control piston 531. Thus the number of the control pistons 531 of the other axial-piston engine 501 is predetermined by the number of the working cylinders 520.

Closing of the shot channel 515 is done in this case by means of the control piston 531, including its control piston cover 532. The control piston 531 is driven by means of a control piston curved track 533, wherein a spacer 534 for the control piston curved track 533 to the output shaft 541 is provided, which also serves in particular for thermal decoupling. In the present exemplary embodiment of the other axial-piston engine 501, the control piston 531 can perform an essentially axially directed stroke motion 543. To this end, each of the control pistons 531 is guided by means of sliders, not further labeled, which are supported in the control piston curved track 533, wherein the sliders each have a safety cam that runs back and forth in a guideway, not further labeled, and prevents the control piston 531 from turning.

Since the control piston 531 comes into contact in the area of the shot channel 515 with the hot working medium from the combustion chamber 510, it is advantageous if the control piston 531 is water-cooled. To this end, the other axial-piston engine 501 has a water cooling system 538, in particular in the area of the control piston 531, wherein the water cooling system 538 includes inner cooling channels 545, middle cooling channels 546 and outer cooling channels 547. Well cooled in this way, the control piston 531 can be moved operationally reliably in a corresponding control piston cylinder.

Furthermore, the surfaces of the control piston 531 that are in contact with combustion agent are reflective, or are provided with a reflective coating, so that a heat input into the control pistons 531 that occurs by way of heat radiation is minimized. The other surfaces of the shot channels 515 and of the combustion chamber 510 in contact with combustion agent are also provided in this exemplary embodiment with a coating with an increased spectral reflexivity. This applies in particular to the combustion chamber floor (not labeled explicitly), but also to the ceramic combustion chamber wall 507. It is understood that this configuration of the surfaces that are in contact with combustion agent can also be present in an axial-piston engine, independently of the other configuration features. It is understood that in modified embodiments additional assemblies can also be reflective, or that the aforenamed reflectivenesses can be at least partially dispensed with.

The shot channels 515 and the control pistons 531 can be provided using especially simple construction, if the other axial piston engine 501 has a shot channel ring 539. In this case the shot channel ring 539 has a middle axis, around which in particular the parts of the working cylinders 520 and of the control piston cylinders are arranged concentrically. Between each working cylinder 520 and control piston cylinder a shot channel 515 is provided, wherein every shot channel 515 is spatially connected to a cutout (not labeled here) of a combustion chamber floor 548 of the combustion chamber 510. In this respect, the working medium can pass from the combustion chamber 510 via the shot channels 515 into the working cylinders 520 and there perform work, by means of which the compressor pistons 550 can also be moved. It is understood that coatings and inserts can also be provided, depending on the concrete configuration, in order to protect in particular the shot channel ring 539 or its material from direct contact with corrosive combustion products or with excessively high temperatures. The combustion chamber floor 548 in turn can be characterized by another ceramic or metallic coating, in particular reflectiveness, on its surface, which on the one hand reduces the heat radiation occurring from the combustion chamber 510 by increasing the reflectivity, and on the other hand reduces the heat conduction by lowering the thermal conductivity.

It is understood that the other axial-piston engine 501 for example can likewise be equipped with at least one combustion agent reservoir and corresponding valves, although this is not shown explicitly in the concrete exemplary embodiment according to FIG. 5. In addition, in the case of the other axial-piston engine the combustion agent reservoir can be provided in a double version, in order to be able to store compressed combustion agent at different pressures. The two existing combustion agent reservoirs can be connected in this case to corresponding pressure lines of the combustion chamber 510, wherein the combustion agent reservoirs are fluid-connectible with or separable from the pressure lines by means of valves. Stop valves or throttle valves, or regulating or control valves, can be provided in particular between the working cylinders 520 or compressor cylinders 560 and the combustion agent reservoir. For example, the aforementioned valves can be opened or closed appropriately during driving-off or acceleration situations, as well as for starting, whereby a surplus of combustion agent can be made available to the combustion chamber 510, at least for a limited period of time. The combustion agent reservoirs are interconnected fluidically preferably between one of the compressor cylinders and one of the heat exchangers. The two combustion agent reservoirs are ideally operated at different pressures, in order thereby to be able to make very good use of the energy provided by the other axial-piston engine 501 in the form of pressure. To this end, the provided upper pressure limit and lower pressure limit at the first combustion agent reservoir can be set by means of an appropriate pressure regulating system below the upper pressure limits and lower pressure limits of the second combustion agent reservoir. It is understood that in this case work can be done on the combustion agent reservoirs with different pressure intervals.

Not shown in the drawing is a thermal insulation of the heat exchangers 270, 470, 570. To this end, an asbestos substitute is placed in an appropriate manner around the respective heat exchangers, which is subsequently secured by a housing. This ensures that with these exemplary embodiments the external temperature of the axial-piston engine does not exceed 450° C. in the vicinity of the heat exchangers under nearly all operating conditions. The only exceptions are overload situations, which occur only briefly anyway. In this case, the thermal insulation is designed to ensure a temperature gradient of 350° C. at the hottest place on the heat exchanger.

Figure 6:
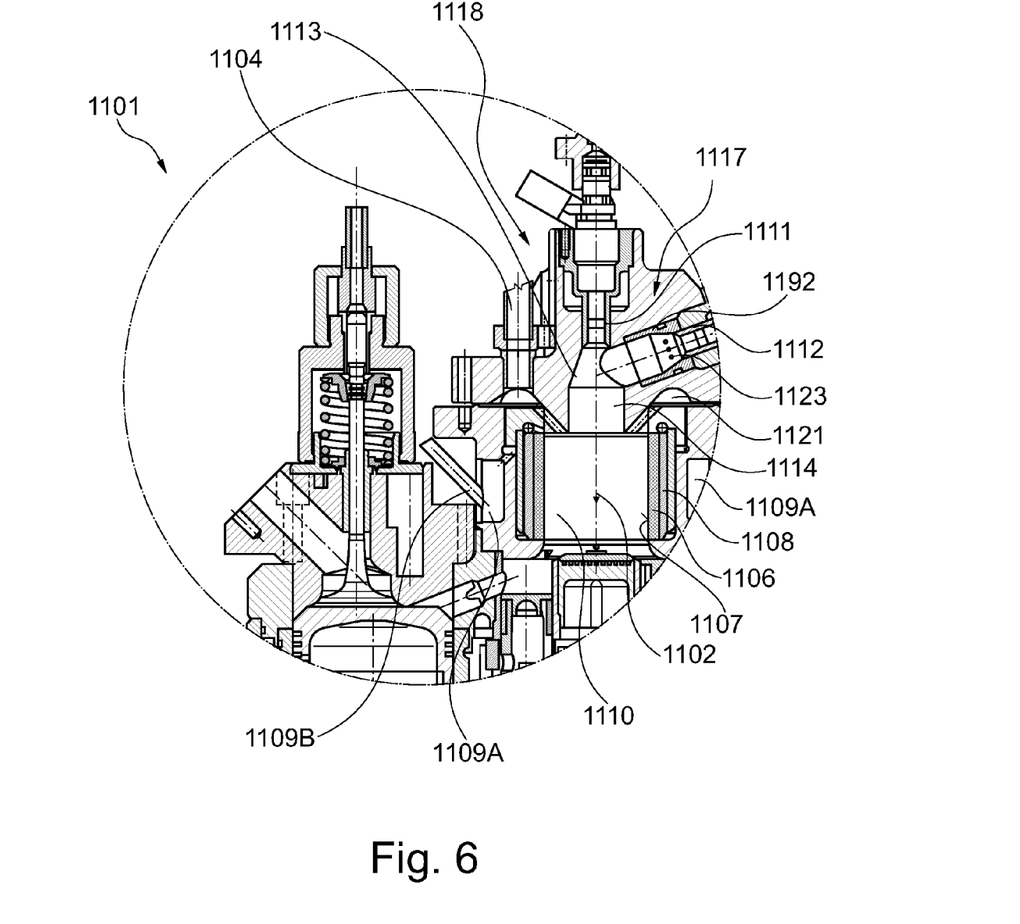
FIG. 6 a schematic detail view of another axial-piston engine, with a water-cooled combustion chamber.
Figure 7:
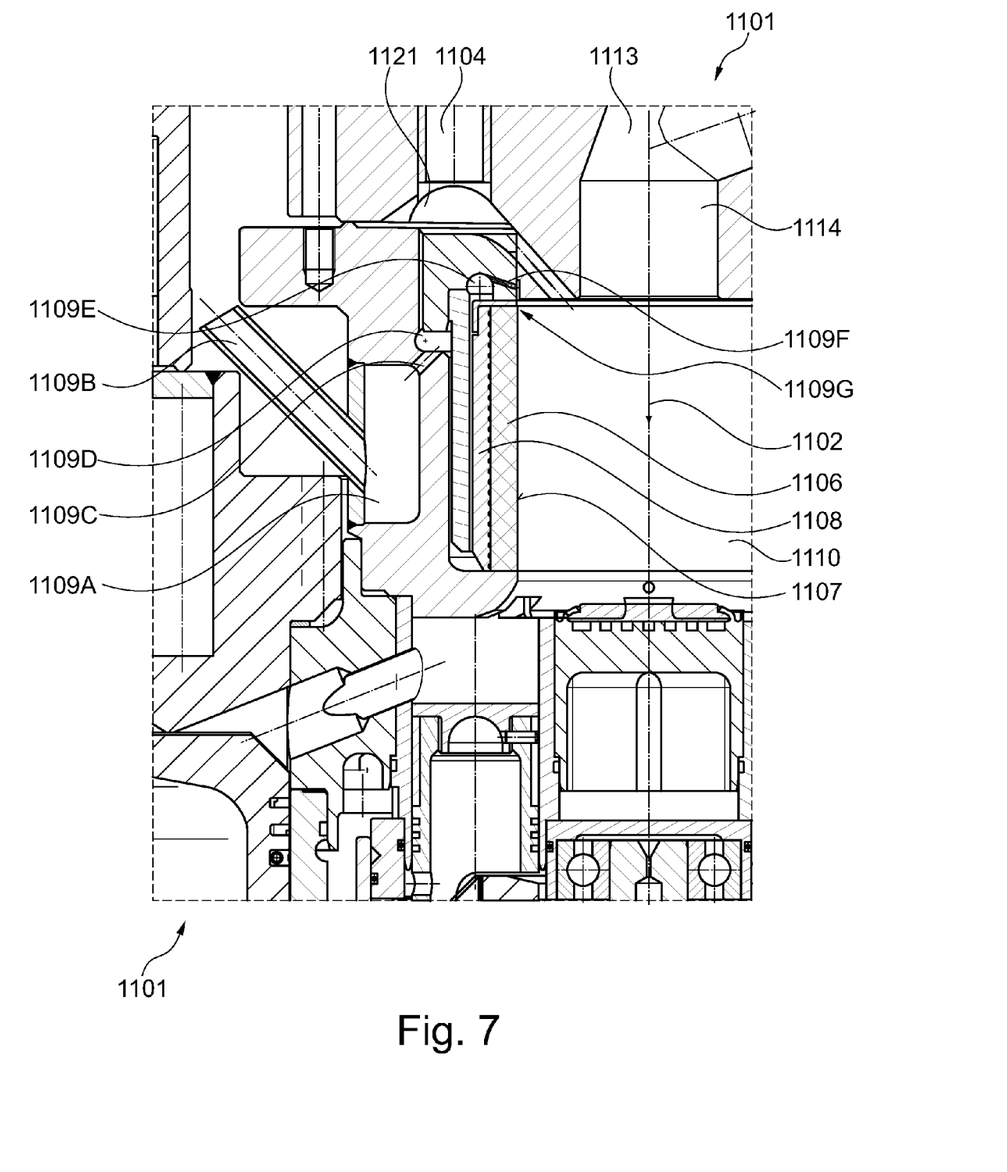
FIG. 7 an enlarged cutout of the depiction according to FIG. 6.
Figure 8:
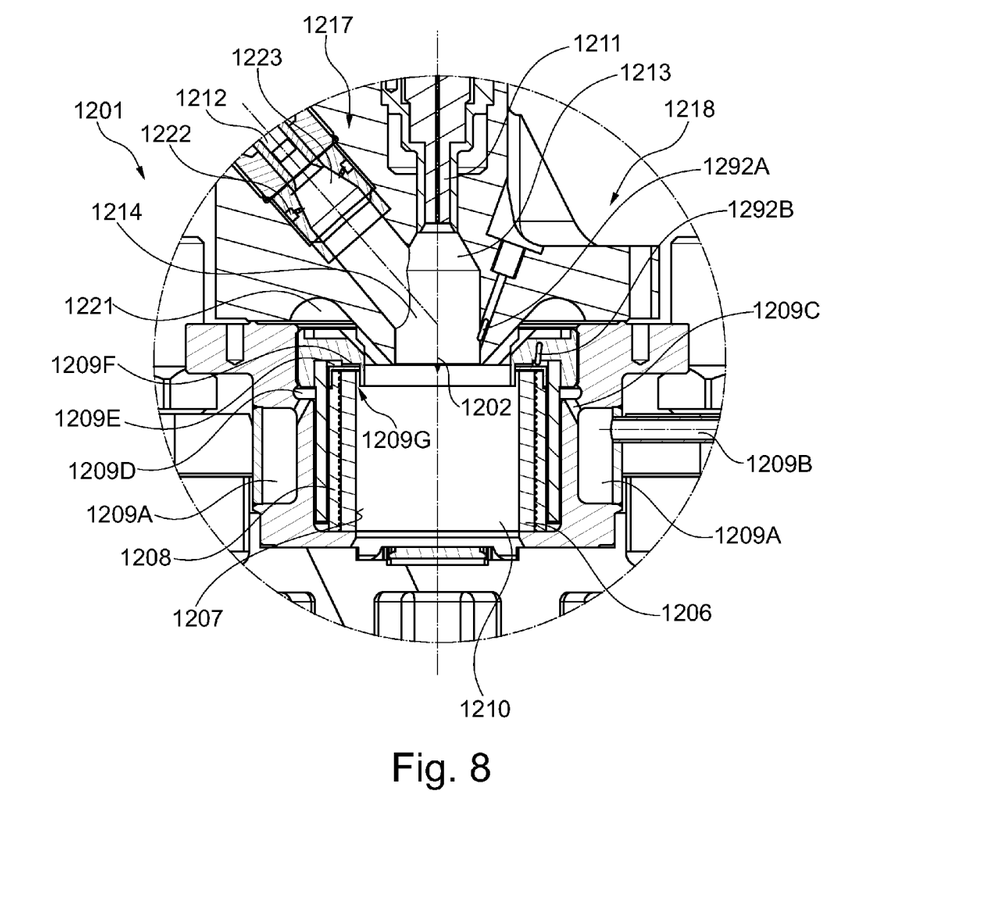
FIG. 8 a schematic detail view of another axial-piston engine, with a water-cooled combustion chamber, in a depiction similar to FIG. 7.

The other axial-piston engines 1101 and 1201 depicted in FIGS. 6 and 8 correspond essentially to the axial-piston engine 501, so that in this respect we will dispense with a repeated explanation of the effect and mode of operation. An essential difference between the axial-piston engines 1101 and 1201 on the one hand and the axial-piston engine 501 on the other hand is the cooling of the combustion chamber 1110 or 1210, which is done by means of water in the case of the axial-piston engines 1101 and 1201. To this end, both axial-piston engines 1101 and 1201 have a water chamber 1109A, 1209A, respectively, which surrounds the combustion chamber 1110, 1210 and is fed with liquid water by way of a supply line 1109B, 1209B. To this end, water is supplied at combustion-chamber pressure by way of the supply line 1109B, 1209B.

This water is applied via branch channels 1109C, 1209C to a ring channel 1109D, 1209D that is in contact with a steel pipe 1108A, 1208A, which in turn surrounds the profiled pipe 1108, 1208 of the respective combustion chamber 1110, 1210, and which is dimensioned so that a ring gap (not labeled) remains in each instance both between the profiled pipe 1108, 1208 and the steel pipe 1108A, 1208A on the one hand as well as between the steel pipe 1108A, 1208A and the housing part that has the branch channels 1109C, 1209C on the other hand, and so that the two ring gaps are connected with one another by way of the end of the steel pipe 1108A, 1208A that faces away from the ring channel 1109D, 1209D. It is understood here that the pipes 1108, 1108A, 1208, 1208A can also be made out of a different material than steel.

Above the profiled pipes 1108, 1208 in the case of the axial-piston engines 1101, 1201, two other ring channels 1109E, 1209E are provided in each instance, which are connected on the one hand to the respective radially inner ring gap and on the other hand open via channels 1109F, 1209F to a ring nozzle 1109G, 1209G that leads into the respective combustion chamber 1110, 1210. The ring nozzle is aligned in this case axially to the combustion chamber wall 1107, 1207, so that the water can also protect the combustion chamber wall 1107, 1207 on the combustion chamber side.

It is understood that the water vaporizes on its way from the supply line 1109B, 1209B to the combustion chamber 1110, 1210, and that the water can be provided with further additives if necessary. It is also understood that the water can be reclaimed if appropriate from the exhaust gas of the respective axial-piston engine and re-used. In addition, the axial-piston engine 1201 has a main chamber temperature sensor 1292A for regulation of the engine and a water temperature sensor 1192B for regulation of the engine. A prechamber temperature sensor is not shown in this exemplary embodiment. The axial-piston engine 1101 can also have corresponding sensors, cumulatively or alternatively.

| Reference labels: | | | |
|---|---|---|---|
| 201 | axial-piston engine | 455 | pressure line |
| 205 | housing body | 456 | ring channel |
| 210 | combustion chamber | 457 | supply line |
| 215 | shot channel | 460 | compressor cylinder |
| 220 | working cylinder | 470 | heat exchanger |
| 225 | exhaust gas channel | 480 | combustion agent reservoir |
| 227 | outlet | 481 | reservoir line |
| 230 | working piston | 485 | valve |
| 235 | connecting rod | 501 | axial-piston engine |
| 240 | curved track | 502 | main combustion direction |
| 241 | output shaft | 503 | axis of symmetry |
| 242 | spacer | 504 | combustion air supply system |
| 250 | compressor piston | 505 | housing body |
| 255 | pressure line | 506 | ceramic assembly |
| 257 | supply line | 507 | ceramic combustion chamber wall |
| 260 | compressor cylinder | 508 | profiled steel pipe |
| 270 | heat exchanger | 509 | cooling air chamber |

-continued

Reference labels:

| | | | |
|---|---|---|---|
| 401 | axial-piston engine | 510 | combustion chamber |
| 405 | housing body | 511 | main nozzle |
| 410 | combustion chamber | 512 | processing nozzle |
| 415 | shot channel | 513 | conical chamber |
| 420 | working cylinder | 514 | cylindrical chamber |
| 425 | exhaust gas channel | 515 | shot channel |
| 427 | outlet | 516 | first jet direction |
| 430 | working piston | 517 | preburner |
| 435 | connecting rod | 518 | main burner |
| 440 | curved track | 519 | other jet direction |
| 441 | output shaft | 520 | working cylinder |
| 442 | spacer | 521 | process air supply |
| 450 | compressor piston | 522 | other combustion air supply |
| 523 | perforated ring | 981 | fuel heater |
| 524 | cooling air chamber supply | 982 | glow plug |
| 525 | exhaust gas channel | 983 | mixing pipe |
| 526 | combustion space | 984 | aligned combustion air supply |
| 530 | working piston | 985 | fuel injection system |
| 531 | control piston | 986 | vaporizer |
| 532 | control piston cover | 987 | spark plug |
| 533 | control piston curved track | 988 | cooling system |
| 534 | spacer | 1001 | axial-piston engine |
| 535 | connecting rod | 1012 | processing nozzle |
| 536 | connecting rod running wheels | 1027 | precombustion chamber |
| 537 | driving curved track carrier | 1080 | fuel processing system |
| 538 | water cooling system | 1081 | fuel heater |
| 539 | shot channel ring | 1082 | glow plugs |
| 540 | curved track | 1083 | mixing pipe |
| 541 | output shaft | 1084 | aligned combustion air supply |
| 543 | stroke motion | 1086 | vaporizer |
| 545 | inner cooling channels | 1087 | spark plug |
| 546 | middle cooling channels | 1095 | check valve |
| 547 | outer cooling channels | 1096 | valve seat |
| 548 | combustion chamber floor | 1097 | ceramic valve ball |
| 550 | compressor piston | 1101 | axial-piston engine |
| 560 | compressor cylinder | 1102 | main combustion direction |
| 570 | heat exchanger | 1104 | combustion air supply |
| 592 | prechamber temperature sensor | 1106 | ceramic assembly |
| 593 | exhaust gas temperature sensor | 1107 | ceramic combustion chamber wall |
| 901 | axial piston engine | 1108 | profiled pipe |
| 912 | processing nozzle | 1108A | steel pipe |
| 927 | precombustion chamber | 1208 | profiled pipe |
| 928 | fuel | 1208A | steel pipe |
| 929 | combustion air | 1209A | water chamber |
| 980 | fuel processing system | 1209B | supply line for liquid water |
| 1109A | water chamber | 1209C | branch channel |
| 1109B | supply line for liquid water | 1209D | ring channel |
| 1109C | branch channel | 1209E | ring channel |
| 1109D | ring channel | 1109F | channel |
| 1109E | ring channel | 1109G | ring nozzle |
| 1109F | channel | 1210 | combustion chamber |
| 1109G | ring nozzle | 1211 | main nozzle |
| 1110 | combustion chamber | 1212 | processing nozzle |
| 1111 | main nozzle | 1213 | conical chamber |
| 1112 | processing nozzle | 1214 | cylindrical chamber |
| 1113 | conical chamber | 1217 | preburner |
| 1114 | cylindrical chamber | 1218 | main burner |
| 1117 | preburner | 1221 | combustion air supply |
| 1118 | main burner | 1222 | combustion air supply |
| 1121 | combustion air supply | 1223 | perforated ring |
| 1123 | perforated ring | 1292A | main chamber temperature sensor |
| 1192 | prechamber temperature sensor | 1292B | water temperature sensor |
| 1201 | axial-piston engine | | |
| 1202 | main combustion direction | | |
| 1206 | ceramic assembly | | |
| 1207 | ceramic combustion chamber wall | | |

The invention claimed is:

1. Axial-piston engine comprising
   at least two axial-piston assemblies, each of the at least two axial-piston assemblies having:
   a working cylinder;
   a compressor cylinder connected to said working cylinder;
   an exhaust gas channel receiving exhaust gas from said working cylinder;
   a continuously working combustion chamber having a first combustion air input and a second combustion air input, said continuously working combustion chamber feeding combustion gas to said working cylinder;
   a pressure line having a first end receiving combustion air from said compressor cylinder, said pressure line having a second end;
   a first combustion air line connecting said second end to said first combustion air input;
   a heat exchanger having a heating flow path and a cooling flow path, said heating flow path having a heating inlet connected to said second end of said pressure line, said heating flow path having a heating outlet, said cooling flow path having a cooling inlet connected to said exhaust gas channel;
   a second combustion air line connecting said heating outlet to said second combustion air input; and
   wherein combustion air at a first temperature is fed into the combustion chamber via the first combustion air input, and wherein combustion air at a second temperature different from the first temperature is fed into the combustion chamber via the second combustion air input.

2. Axial-piston engine according to claim 1, further comprising a combustion chamber temperature sensor for determination of the temperature in the combustion chamber, wherein the at least one working cylinder has an exhaust gas outlet.

3. Axial-piston engine according to claim 2, wherein the combustion chamber temperature sensor measures a flame temperature in the combustion chamber.

4. Axial-piston engine according to claim 2, comprising a combustion chamber regulating system which includes the combustion chamber temperature sensor as input sensor and regulates the combustion chamber so that the combustion chamber temperature is between 1,000° C. and 1,500° C.

5. Axial-piston engine according to claim 4, comprising an exhaust gas temperature sensor for determination of the exhaust gas temperature.

6. Axial-piston engine according to claim 5, wherein the combustion chamber regulating system includes the exhaust gas temperature sensor as input sensor and regulates the combustion chamber in such a way that the exhaust gas temperature in an operating state is between 850° C. and 1,200° C.

7. Axial-piston engine according to claim 6, wherein the operating state is idling.

8. Axial-piston engine according to claim 2, wherein the combustion chamber temperature sensor is a precombustion chamber temperature sensor.

9. Axial-piston engine according to claim 1, wherein the combustion chamber has a combustion chamber floor of reflective metal.

10. Axial-piston engine according to claim 2, wherein the combustion chamber has a wall or floor that is reflective.

* * * * *